No. 685,720. Patented Oct. 29, 1901.
G. C. HAWKINS.
ELECTRIC FAN.
(Application filed Jan. 24, 1901.)
(No Model.)
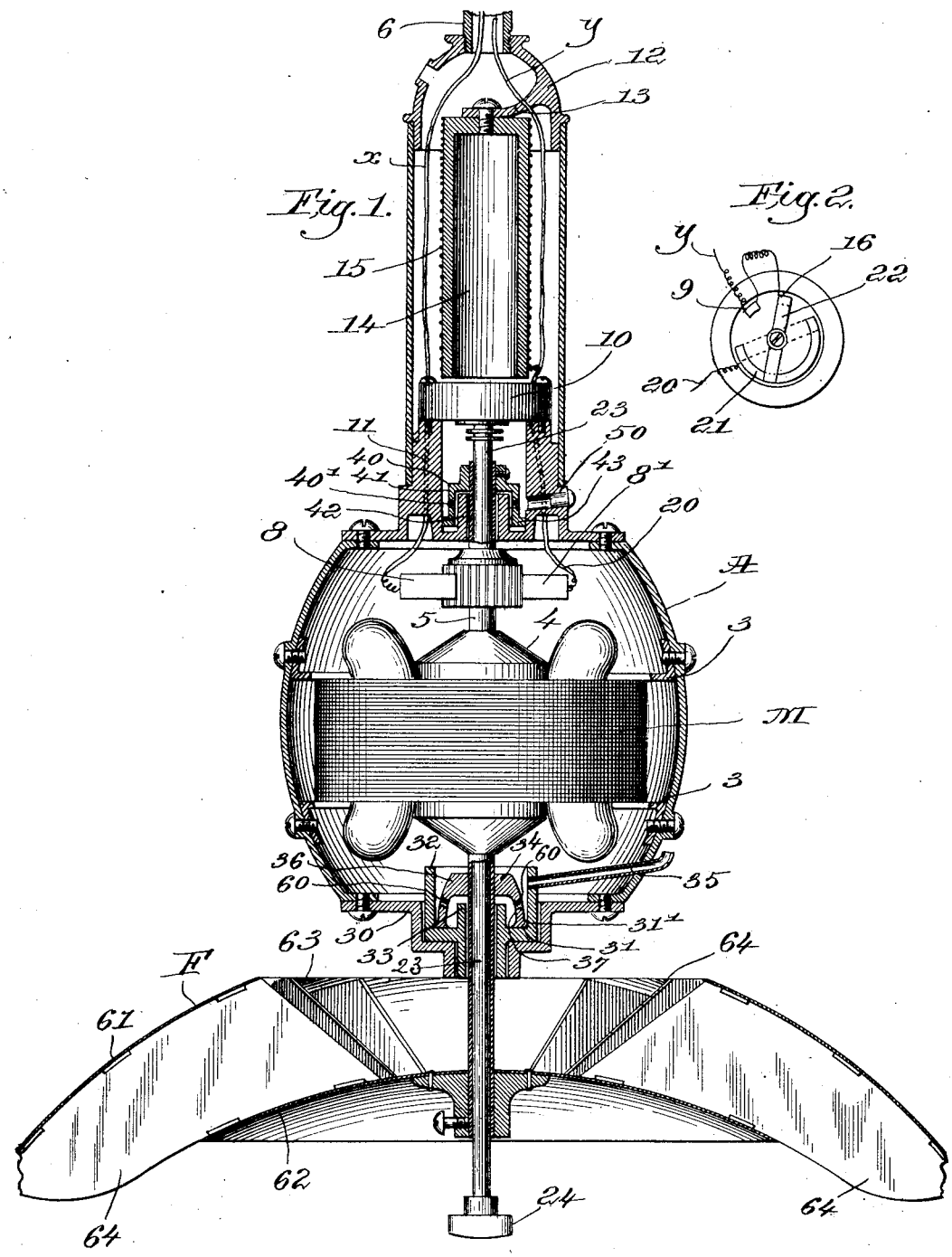
Witnesses.
Thomas J. Drummond.
John J. M. Gargill
Inventor.
Gardiner C. Hawkins,
by Crosby & Gregory
Attys.

UNITED STATES PATENT OFFICE.

GARDNER C. HAWKINS, OF BOSTON, MASSACHUSETTS, ASSIGNOR TO BOSTON ELECTRIC HEATING AND POWER COMPANY, OF PORTLAND, MAINE, AND BOSTON, MASSACHUSETTS, A CORPORATION OF MAINE.

ELECTRIC FAN.

SPECIFICATION forming part of Letters Patent No. 685,720, dated October 29, 1901.

Application filed January 24, 1901. Serial No. 44,564. (No model.)

*To all whom it may concern:*

Be it known that I, GARDNER C. HAWKINS, a citizen of the United States, residing at Boston, in the county of Suffolk and State of Massachusetts, have invented an Improvement in Electric Fans, of which the following description, in connection with the accompanying drawings, is a specification, like characters on the drawings representing like parts.

This invention relates to electric fans; and its object is to provide a novel fan which is adapted to be suspended vertically from the ceiling of the room where it is to be used. Heretofore in some devices of this class whenever the fan has been suspended from the ceiling or mounted upon a vertical shaft the oil in the bearings has worked down the armature-shaft from the bearings and into the fan, so that articles under the fan are liable to be spattered with oil, the rapidly-revolving fan throwing the oil in fine drops.

My invention has for one of its objects to provide a form of bearing for the vertical armature-shaft of the fan which will prevent the oil from coming in contact with the armature-shaft, and thus prevent any oil from being thrown by the fan. This object is accomplished by providing a cup-shaped bearing having an exterior and an interior concentric flange, said flanges forming between them an annular oil-chamber, in which rests a bell-shaped bearing member attached to the armature-shaft, the said armature-shaft passing through an aperture in the cup-shaped bearing, which is slightly larger than the said shaft, the said shaft being centered by making the lower edge of the bell-shaped member of such a size as to fit the exterior side walls of the cup-bearing. The bell-shaped member is spaced from the inner concentric flange of the cup-bearing so as not to contact therewith, and the conical or bell shape of the bearing member prevents the oil in the oil-chamber from being thrown upward or onto the armature, and as there is no contact between the bell-shaped member and the inner wall or concentric flange of the cup-bearing or between the armature-shaft and the cup-bearing there is no chance for the oil to get on the shaft and run down into the fan. The upper end of the armature-shaft is provided with a suitable centering device.

Another feature of the invention resides in making the armature-shaft hollow and in placing therein an operating-rod connected to a rheostat contained in the casing above the motor, whereby the speed of the motor may be regulated from beneath.

Figure 1 of the drawings illustrates a vertical section of an electric fan embodying my invention, and Fig. 2 a detail showing one form of rheostat or switch.

The motor for operating the fan may be of any suitable kind and is designated generally by M, the field-magnets of said motor being stationarily mounted in a suitable casing A, and, as illustrated, the said casing is provided with the flanged rings 3, which form a support for the said field-magnets of the motor. The armature 4 is mounted upon a vertical hollow shaft 5, which is supported in bearings, as herein described, the said shaft having fixed thereto at its lower end the fan F, which may be of any suitable type. The casing A is suspended from the ceiling by means of the pipe 6, the said pipe furnishing a conduit for the wires of the circuit which furnishes power to the motor, the line-wire $x$ being shown as connected directly to the brush 8, and the brush 8' being connected by the wire 20 to the contact-plate 21 of the switch 10, and the line-wire $y$ leading to the switch-point 9, the said switch being of any suitable type and being supported upon the portion 11 of the casing, as illustrated in Fig. 1. The cap-plate 12 of the casing has an arm 13 projected therefrom, to which is attached a tube 14 of some suitable insulating material, such as porcelain, around which are wound the coils 15 of a suitable resistance medium, such as German-silver wire, the said resistance being connected to the points 9 and 16 of the switch 10, as shown diagrammatically in Fig. 2. The movable switch-point 22 is attached to the upper end of a rod 23, which passes through the hollow armature-shaft 5 and projects somewhat beyond the lower end of the fan, said projecting end terminating in a handle or knob 24, by means of which the said rod may be manipulated. From this description it will be seen that by turning the rod 23 the movable switch-point 22 may be turned so as to either cut out the motor, throw in the resistance 15, or cut the said resistance out, according as the motor is to be stopped, to be run at half speed, or to be run at full speed, and such manipulation of the switch is done from beneath the fan.

It is common in ceiling-fans to provide the rotating shaft to which the fan is attached with a step-bearing below the fan, this construction being employed in preference to one in which the step-bearing is above the fan, because in the latter construction the oil from the bearing is extremely liable to run down the armature-shaft from the bearing and be thrown by the fan. In order to prevent this, I have devised a step-bearing for the rotating armature-shaft, which is situated between the armature and fan and which is so constructed that it is impossible for the oil to contact with the armature-shaft. In my improved step-bearing the armature-shaft passes through the bearing, but does not contact therewith, the shaft being supported by a conical or bell-shaped flange or bearing member which is rigid with the shaft and rests at its lower edge in an annular groove or chamber in a cup-shaped bearing member fast to the casing, the said chamber containing oil. The lower edge of the bell-shaped bearing member has a tip extending therefrom, which engages the outside wall of the annular chamber, thus holding the shaft against any lateral movement and preventing it from contacting with the walls of the aperture through the bearing. The inner surface of the bell-shaped or conical flange or bearing is spaced from the inner flange or wall of the cup-shaped bearing, so as not to contact therewith, and hence it is impossible for the oil to work up over said inner flange and down through the bearing. The said bell-shaped bearing is also provided with a series of apertures, and owing to the bell shape of the bearing member any oil which tends to work up the inside surface of the same toward the armature-shaft is thrown by centrifugal force out through the apertures and down the outside surface thereof toward that portion which has the largest diameter.

Referring to the drawings, it will be seen that the casing A is provided at its lower portion with a head 30, having a central recess in which is rigidly secured the cup-shaped bearing member 31, the said bearing member having centrally therethrough an aperture slightly larger than the armature-shaft and through which the said shaft projects, said cup-shaped bearing member being provided with the exterior flange 32 and the concentric interior flange 33, the said flanges forming between them an annular oil-chamber in which is supported the bell-shaped bearing 34, fast upon the armature-shaft. The lower edge of the bell-shaped bearing 34 rests upon the bottom of the cup-shaped bearing 31, and in order to prevent the armature-shaft from contacting with the bearing I have made the said lower edge of the bell-shaped bearing 34 with a lip 31' of such a size as to fit and contact with the inner wall of the exterior flange 32. An annular space is left between the inner wall or surface of the bell-shaped bearing 34 and the inner flange 33 of the cup-bearing, the bell-shaped bearing 34 engaging the cup-bearing only on the bottom of the oil-chamber. It will thus be seen that the bell-shaped bearing 34 is in the nature of a step-bearing, which supports the weight of the armature-shaft and has the additional function of centering the said shaft, so as to prevent it from coming in contact with the bearing and to prevent the armature from striking the field-magnets. A suitable oil-duct 35 leads into the cup-bearing 32 and projects through the casing A, whereby oil may be supplied to the oil or bearing chamber of the said cup-bearing. The exterior surface of the bell-shaped bearing 34 is conical, as shown at 36, by reason of which construction it will readily be seen that the centrifugal force of the said rapidly-rotating bell-shaped bearing 34 will operate to prevent the oil from working up the outside of the same to the smaller portion of the conical surface, this construction therefore preventing the oil from working up onto the armature. Since there is no contact between the inner flange 33 and the bell-shaped bearing 34, the oil in the cup-bearing 31 will not work up over said flange and down the interior of the aperture in said cup-bearing 31, as would be the case if the bell-shaped member had a bearing against said flange 33. I will preferably provide the said bell-shaped bearing with a series of apertures 60, which coöperate with its inner conical face 37 to prevent any oil from working up onto the shaft 5 beneath said bearing member, the centrifugal force throwing the oil either out through said aperture to the exterior surface of the bearing member 34 or down to the larger portion of said inner surface 37, as will be readily understood by those skilled in the art.

From the above description it will be seen that the only place of contact between the rotating and stationary parts of the step-bearing, and hence the only portion that needs lubrication, is between the lower edge of the bell-shaped bearing 34 and the bottom of the cup member 32, and because of the bell shape or conical construction of the step member 34 and the annular space between the inner flange 33 and the said step member 34 the oil is prevented from coming in contact with the shaft 5, and there is no danger, therefore, of any oil getting either onto the armature or into the fan.

Preferably the upper end of the armature-shaft will have some suitable centering device attached thereto, so as to hold the shaft in proper alinement, and thus prevent the armature from striking the field-magnet, and such centering device is illustrated as an inverted-cup-shaped bearing 40, which is rigidly fastened to the said shaft, the lower portion of said cup-shaped member rotating in an annular chamber 41 in the portion 11 of the casing, said chamber being formed by the upturned annular flange 42. This annular flange 42 surrounds an aperture which is slightly larger than the armature-shaft 5, and the said shaft is centered by the outturned flange 43 of the said cup-shaped member 40 engaging the outer wall of the chamber 41, as illustrated. It will be seen from Fig. 1 that an annular space is left between the cup-shaped centering devices 40 and the annular flange 42 of the casing, so that the only bearing-surface at the upper end of the armature-shaft is between the flange 43 and the exterior wall of the chamber 41, the whole weight of the armature-shaft being supported by the step-bearing at the lower end of the casing. Preferably a suitable aperture 50 will be bored through the portion 11 of the casing for the purpose of supplying oil to the chamber 41, and this aperture may be closed by any suitable plug or screw, as shown. As seen in Fig. 1, the centering device 40 has a series of apertures 40' therethrough, which apertures perform the same function as the aperture 60 in the bell-shaped bearing member 34. Inasmuch as the armature-shaft does not itself touch the bearing at any point and because of the particular shape of the bearing members, it will be seen that the centrifugal action will absolutely prevent any oil from getting onto the armature-shaft.

The fan F is of especial construction—that is, it has the two concaved disks 61 and 62, the disk 62 being solid and secured concentrically to the shaft 5 in any suitable way and the disk 61 being larger than the disk 62 and having the enlarged central aperture 63 therein, the two disks being secured together by a series of radially-arranged vertical partitions or floats 64, which extend from the aperture 63 to the outer edge of the disk 61 and divide the space between the two disks into a series of radially-arranged channels. As the fan is rotated the air is drawn through the central aperture 63 and is forced by centrifugal action out through the channels between the floats 64, as will be readily understood.

It will be obvious that various changes may be made in the construction of the device without departing from the spirit of my invention.

Having described my invention, what I claim as new, and desire to secure by Letters Patent, is—

1. An electric fan, comprising a suspended casing, an electric motor therein having an armature arranged to rotate about a vertical axis, a hollow armature-shaft to which the fan is attached, a resistance-coil and a switch in said casing above the motor, and an operating-rod passing through the hollow armature-shaft and projecting below the fan whereby the speed of the motor may be regulated from beneath.

2. An electric fan comprising a suspended casing, a motor therein, having a vertically-arranged armature-shaft to which the fan is attached, a cup-shaped bearing concentric with said armature-shaft, and a bell-shaped bearing member rigidly attached to the armature-shaft and having its lower edge seated in said cup-shaped bearing, the lower edge only of the bell-shaped member engaging the cup-bearing, the inner surface of said bell-shaped member being spaced from the inner wall of the cup member.

3. An electric fan comprising a suspended casing, a motor therein, having a vertically-arranged armature-shaft to which the fan is attached, a cup-shaped bearing concentric with said armature-shaft, and a bell-shaped bearing member rigidly attached to the armature-shaft and supported in said cup-shaped bearing, the bearing edge of the bell-shaped member contacting with the outside wall of the cup-bearing whereby the armature-shaft is centered and the inner surface of the said bell-shaped member being spaced from the inner wall of the cup member.

4. An electric fan comprising a suspended casing, an electric motor therein having a vertically-arranged armature-shaft to which the fan is attached, a stationary bearing member mounted in the lower end of the casing and having an aperture therein slightly larger than the armature-shaft and through which said shaft projects, an annular chamber surrounding said aperture, and a conical bearing member rigid with the armature-shaft and supported at its lower end in said annular chamber, the conical surface of the rotating bearing member preventing the oil in the chamber from working up onto the armature-shaft.

5. In an electric fan, a suspended casing, a motor therein, having a vertically-arranged armature-shaft to which the fan is attached, a cup-shaped bearing concentric with the said shaft and having an aperture slightly larger than said shaft and through which said shaft projects, a bell-shaped step-bearing rigidly attached to the shaft and supported in said cup-bearing, said bell-shaped step-bearing member having a series of apertures therein.

6. In an electric fan, a suspended casing, a motor therein, having a vertically-arranged armature-shaft to which the fan is attached, a cup-shaped bearing concentric with the said shaft and having an aperture slightly larger than said shaft and through which said shaft projects, a bell-shaped step-bearing rigidly attached to the shaft and supported in said cup-bearing, said step-bearing being spaced from the inner wall of the cup-bearing, and a centering device for the upper end of said shaft.

7. In an electric fan, a motor having a vertically-arranged armature-shaft, a fan attached to the lower end of said shaft, a step-bearing supporting said shaft between the fan and armature, said step-bearing comprising a stationary cup-bearing and a bell-shaped member rigidly secured to the armature-shaft and supported in said cup-member, the inner face of said bell-shaped member being out of contact with the cup-bearing, combined with a centering device for the upper end of the shaft.

8. In an electric fan, a motor having a vertically-arranged armature-shaft, to which a fan is attached, a step-bearing for the lower end of said shaft comprising a cup member having an aperture slightly larger than the said shaft and through which the shaft projects, and a bell-shaped member fast on the armature-shaft and resting in said cup member, combined with a centering device for the upper end of the shaft comprising a stationary support surrounding the said shaft without contacting therewith, said support having an annular groove, and a flanged collar fast on the shaft and engaging the exterior wall of said groove.

9. An electric fan comprising a suspended casing, an electric motor therein having a vertically-arranged armature-shaft to which a fan is attached, a resistance-coil and a switch in said casing above the armature and means operable from beneath the fan to control the switch whereby the resistance-coil may be thrown into or out of the circuit.

In testimony whereof I have signed my name to this specification in the presence of two subscribing witnesses.

GARDNER C. HAWKINS.

Witnesses:
 GEO. W. GREGORY,
 LOUIS C. SMITH.